United States Patent
Fonoberov et al.

(10) Patent No.: US 11,604,210 B2
(45) Date of Patent: Mar. 14, 2023

(54) AFM IMAGING WITH REAL TIME DRIFT CORRECTION

(71) Applicant: Bruker Nano, Inc., Santa Barbara, CA (US)

(72) Inventors: Vladimir Fonoberov, Santa Barbara, CA (US); Jason Osborne, Lompoc, CA (US); Sean Hand, Santa Barbara, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

(21) Appl. No.: 17/370,624

(22) Filed: Jul. 8, 2021

(65) Prior Publication Data
US 2023/0009857 A1 Jan. 12, 2023

(51) Int. Cl.
*G01Q 60/38* (2010.01)
*B82Y 35/00* (2011.01)
*G01Q 30/06* (2010.01)
*G01Q 10/06* (2010.01)

(52) U.S. Cl.
CPC ............. *G01Q 60/38* (2013.01); *B82Y 35/00* (2013.01); *G01Q 10/06* (2013.01); *G01Q 30/06* (2013.01)

(58) Field of Classification Search
CPC ........ G01Q 60/38; G01Q 10/06; G01Q 30/06; B82Y 35/00
USPC ............... 850/1, 2, 3, 4, 5, 6, 7, 8, 9, 10, 11
See application file for complete search history.

(56) References Cited

U.S. PATENT DOCUMENTS

| | | |
|---|---|---|
| 5,898,106 A | 4/1999 | Babcock et al. |
| 8,296,860 B2 | 10/2012 | Liu et al. |
| 10,037,865 B2 * | 7/2018 | Al-Fandi ................. H01J 37/28 |
| 2007/0251306 A1 | 11/2007 | Zhou et al. |
| 2013/0081159 A1 | 3/2013 | Liu et al. |

* cited by examiner

*Primary Examiner* — Nicole M Ippolito
(74) *Attorney, Agent, or Firm* — Boyle Fredrickson S.C.

(57) ABSTRACT

A system and method of operating an atomic force microscope (AFM) that includes providing relative scanning motion between a probe of the AFM and a sample in a slow scan direction of a data scan to generate a reference image (plane) of a region of interest. Then, relative scanning motion between the probe and the sample is provided in a fast scan direction of a final data scan to generate a data image. By mapping the data image against the reference image in real-time during the supplying step, the preferred embodiments generate a final drift corrected data image without post-image acquisition processing.

15 Claims, 6 Drawing Sheets

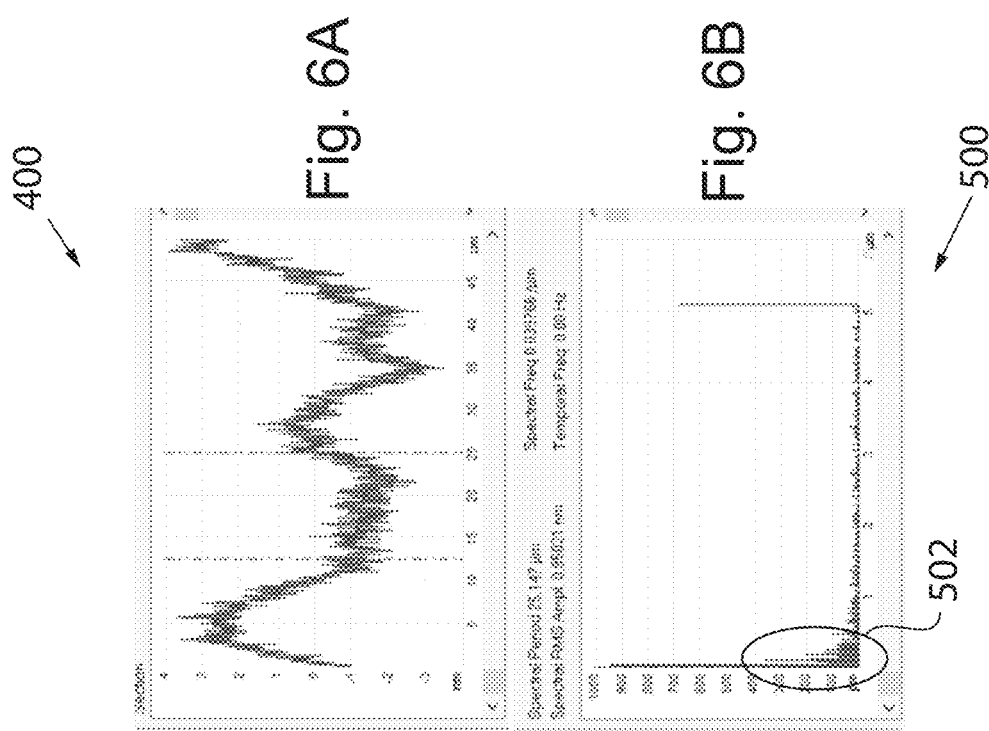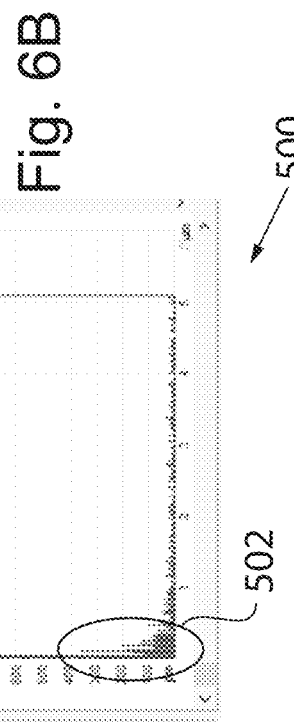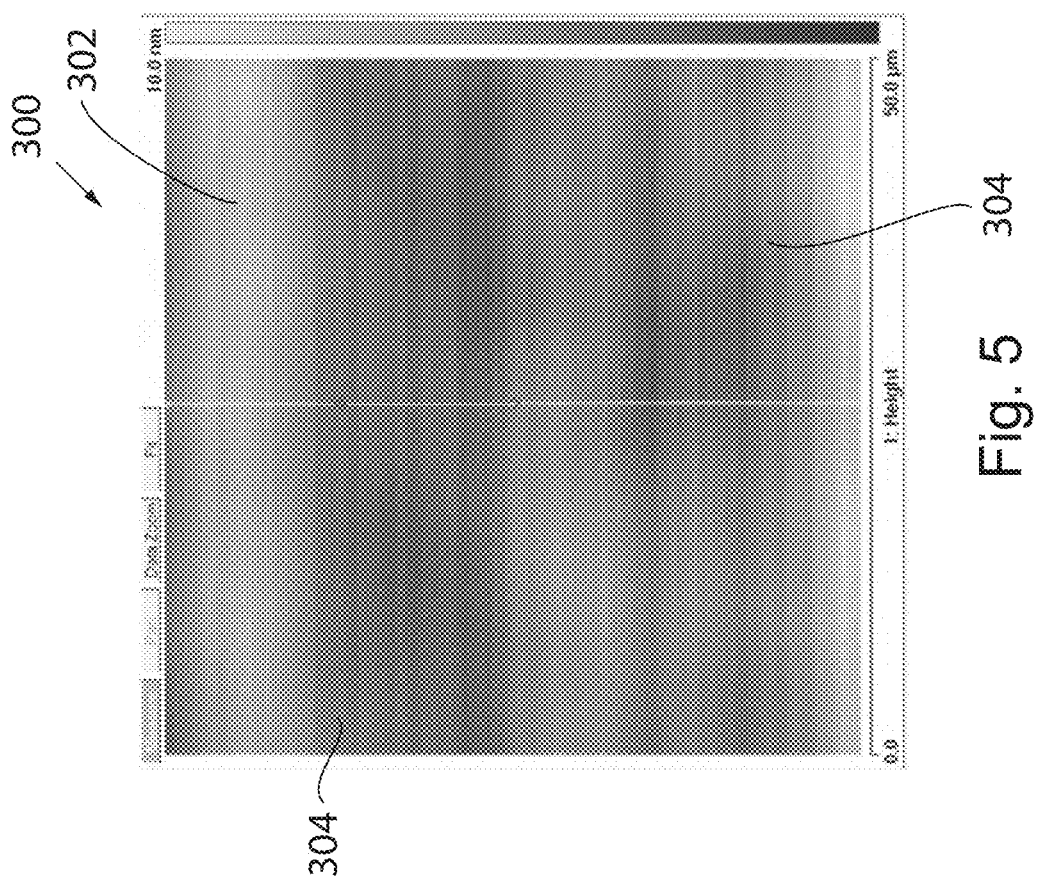

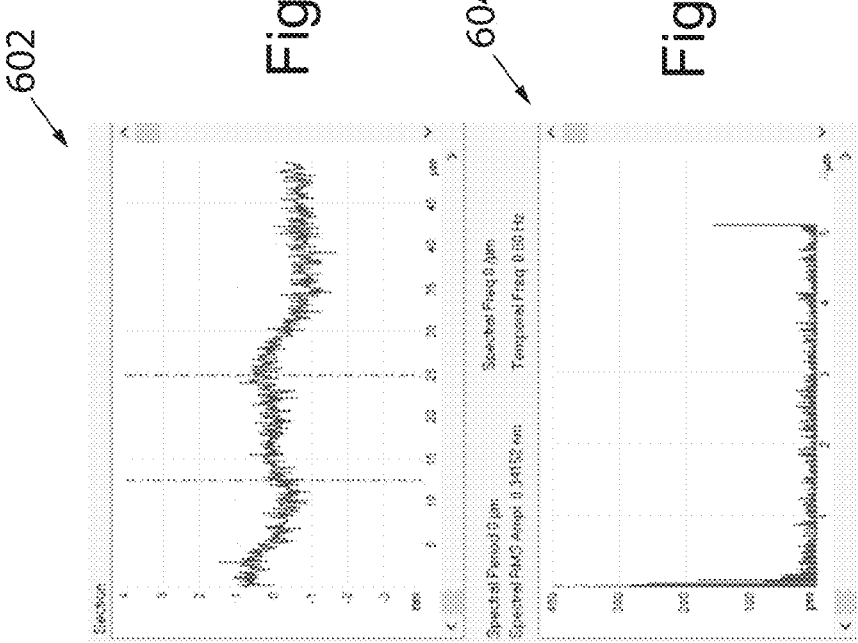
Fig. 8A
Fig. 8B
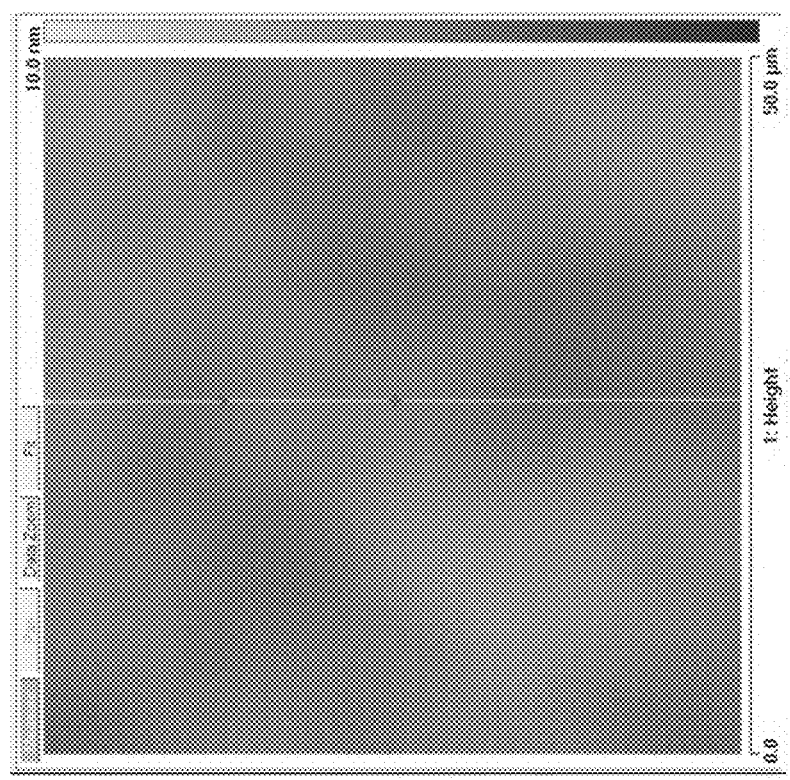
Fig. 7

AFM IMAGING WITH REAL TIME DRIFT CORRECTION

BACKGROUND OF THE INVENTION

Field of the Invention

The preferred embodiments are directed to Atomic Force Microscopy (AFM), and in particular, a real time method for compensating for drift in AFM data collection.

Description of Related Art

Scanning probe microscopes such as atomic force microscopes (AFMs) are devices which employ a probe having a tip, and causing the tip to interact with the surface of a sample with appropriate forces to characterize the surface down to atomic dimensions. Generally, the probe is introduced to a surface of a sample and by providing relative scanning movement between the tip and the sample, surface characteristic data can be acquired over a particular region of the sample, and a corresponding map of the sample can be generated.

A typical AFM system is shown schematically in FIG. 1. An AFM 10 employing a probe device 12 including a probe 14 having a cantilever 15. Scanner 24 generates relative motion between the probe 14 and sample 22 while the probe-sample interaction is measured. In this way images or other measurements of the sample can be obtained. Scanner 24 is typically comprised of one or more actuators that usually generate motion in three orthogonal directions (XYZ). Often, scanner 24 is a single integrated unit that includes one or more actuators to move either the sample or the probe in all three axes, for example, a piezoelectric tube actuator. Alternatively, the scanner may be an assembly of multiple separate actuators. Some AFMs separate the scanner into multiple components, for example an XY scanner that moves the sample and a separate Z-actuator that moves the probe. The instrument is thus capable of creating relative motion between the probe and the sample while measuring the topography or some other surface property of the sample as described, e.g., in Hansma et al. U.S. Pat. No. RE 34,489; Elings et al. U.S. Pat. No. 5,266,801; and Elings et al. U.S. Pat. No. 5,412,980.

In a common configuration, probe 14 is often coupled to an oscillating actuator or drive 16 that is used to drive probe 14 at or near a resonant frequency of cantilever 15. Alternative arrangements measure the deflection, torsion, or other motion of cantilever 15. Probe 14 is often a microfabricated cantilever with an integrated tip 17.

Commonly, an electronic signal is applied from an AC signal source 18 under control of an SPM controller 20 to cause actuator 16 (or alternatively scanner 24) to drive the probe 14 to oscillate. The probe-sample interaction is typically controlled via feedback by controller 20. Notably, the actuator 16 may be coupled to the scanner 24 and probe 14 but may be formed integrally with the cantilever 15 of probe 14 as part of a self-actuated cantilever/probe.

Often a selected probe 14 is oscillated and brought into contact with sample 22 as sample characteristics are monitored by detecting changes in one or more characteristics of the oscillation of probe 14, as described above. In this regard, a deflection detection apparatus 25 is typically employed to direct a beam towards the backside of probe 14, the beam then being reflected towards a detector 26. As the beam translates across detector 26, appropriate signals are processed at block 28 to, for example, determine RMS deflection and transmit the same to controller 20, which processes the signals to determine changes in the oscillation of probe 14. In general, controller 20 generates control signals to maintain a relative constant interaction between tip 17 and sample 22 (or deflection of the lever 15), typically to maintain a setpoint characteristic of the oscillation of probe 14. More particularly, controller 20 may include a PI Gain Control block 32 and a High Voltage Amplifier 34 that condition an error signal obtained by comparing, with circuit 30, a signal corresponding to probe deflection caused by tip-sample interaction with a setpoint. For example, controller 20 is often used to maintain the oscillation amplitude at a setpoint value, $A_S$, to insure a generally constant force between tip 17 and sample 22. Alternatively, a setpoint phase or frequency may be used.

A workstation 40 is also provided, in the controller 20 and/or in a separate controller or system of connected or stand-alone controllers, that receives the collected data from the controller and manipulates the data obtained during scanning to perform point selection, curve fitting, and distance determining operations.

AFMs may be designed to operate in a variety of modes, including contact mode, non-contact mode, and oscillating mode. Operation is accomplished by moving either the sample or the probe assembly up and down relatively perpendicular to the surface of the sample in response to a deflection of the cantilever of the probe assembly as it is scanned across the surface. Scanning typically occurs in an "x-y" plane that is at least generally parallel to the surface of the sample, and the vertical movement occurs in the "z" direction that is perpendicular to the x-y plane. Note that many samples have roughness, curvature and tilt that deviate from a flat plane, hence the use of the term "generally parallel." In this way, the data associated with this vertical motion can be stored and then used to construct an image of the sample surface corresponding to the sample characteristic being measured, e.g., surface topography. In one mode of AFM operation, known as TappingMode™ AFM (TappingMode™ is a trademark of the present assignee), the tip is oscillated at or near a resonant frequency of the associated cantilever of the probe. A feedback loop attempts to keep the amplitude of this oscillation constant to minimize the "tracking force," i.e., the force resulting from tip/sample interaction.

Alternative feedback arrangements keep the phase or oscillation frequency constant. As in contact mode, these feedback signals are then collected, stored, and used as data to characterize the sample. Note that "SPM" and the acronyms for the specific types of SPMs, may be used herein to refer to either the microscope apparatus or the associated technique, e.g., "atomic force microscopy." In an improvement on the ubiquitous TappingMode™, called Peak Force Tapping® (PFT) Mode, discussed in U.S. Pat. Nos. 8,739,309, 9,322,842 and 9,588,136, which are expressly incorporated by reference herein, feedback is based on force (also known as a transient probe-sample interaction force) as measured in each oscillation cycle.

Regardless of their mode of operation, AFMs can obtain resolution down to the atomic level on a wide variety of insulating and conductive surfaces in air, liquid, or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research.

In this regard, AFMs may be employed in automated applications, including in high-precision manufacturing processes such as in semiconductor fabrication. Because AFMs can provide high resolution measurement of nanoscale surface features (e.g., topography), AFM has proven to be useful in the semiconductor space. However, classically, AFM data has been hindered by mechanical perturbations in the system, including drift and creep, both of which are intrinsic problems to most AFMs. Drift is an artifact that occurs in any type of SPM, or indeed any microscopy, but is much more serious in high resolution instruments like AFM. It is known as "drift" because, in general, the sample (or probe) moves slowly in a certain direction. This can typically be recognized as a "distortion" of the image, which changes when you change the slow scan direction. The effect may be particularly pronounced if the user moves to a new region of interest within the scan range. Piezo creep occurs when you apply a set voltage to the piezo scanner, and then try to maintain it in order to move to a particular location. The piezo tends to continue to move in the same direction for a certain period of time. Essentially, especially when a new image scan is started, there will be some stretching or compression of features. Piezo creep will often settle down over time during the AFM image scan, but remains a problem.

More particularly with respect to the present case, a problem encountered when attempting to take vertical metrology measurements using an AFM arises due to imperfections in the scanning motion, or in the detection of the probe's "z" motion during scanning. For example, as noted above, AFM scanners typically use a piezoelectric tube to provide lateral (XY) scanning motion as well as vertical (Z) motion. As the probe tip is moved to effect a scanning operation, the scanner approximates a "pendulum" motion so that the probe tip is lifted slightly from the sample surface as it moves away from the point of scan origin. The AFM attempts to compensate for this tip lift by controlling voltages to the actuator to extend the probe towards the sample so that the tip tracks the surface. As a result of this pendulum motion and resultant feedback compensation, images of flat surfaces may appear curved or "bowed." A typical magnitude of this "bowing" effect is on the order of, for example, ten nanometers vertical excursion for a fifty-micron lateral scanning motion. A similar effect may also be caused by coupling of X and Y with some Z motion due to imperfections in the piezo or other actuators. This curvature precludes the precise determination of a useful reference surface, and accurate metrology measurements of very small vertical dimensions.

Imprecision in the detection of the cantilever motion may also lead to errors in scanning. Scanners can "age", i.e., their characteristics, including bow and hysteretic effects, can change significantly with time. These factors can also preclude accurate vertical metrology measurements. Furthermore, the repeatability of the measurements may be compromised due to a number of factors including hysteresis and aging (which causes scanners to change with time), sample tilt, and other factors, making pre-calibration difficult at the level of accuracy needed.

Conventional techniques used to remove AFM scanner/ instrument error typically are not successful in accommodating these errors, as well as detection idiosyncrasies like those described above. One such conventional technique involves modeling the instrument error as a simple mathematical function. For example, one can compute the best fit of the scan data to a theoretical surface defined by a polynomial or other simple function. Subtracting this theoretical surface from the scanning data then removes part of the scanning error. In the case of an AFM, however, the bow, hysteresis, and detection errors often cannot be accurately described by simple mathematical functions. Furthermore, the fitting step can be compromised by features that deviate from a smooth surface, perhaps the very features requiring measurement. Fitting and subtraction therefore often do not lead to improvements in accuracy sufficient for many applications which require an accuracy on the order of 1 nm or more.

Another type of attempt to correct for instrument error uses reference subtraction. In this technique, a reference scan is made of a standard sample. A likely reference sample candidate would be one having a flat surface such as that of a cleaved or polished silicon wafer. This scan then is subtracted from all data scans of subsequent samples. See U.S. Pat. No. 5,283,630 by Yoshizumi. This technique is commonly also used with interferometers to correct for optical imperfections. In the case of the AFM, however, hysteresis leads to scanner idiosyncrasies that depend on overall sample tilt which may vary significantly from sample to sample. These errors therefore will vary from a reference sample to a new sample and from scan-to-scan. Hence, a "standard sample" does not exist, and it is not possible to remove scanning errors using standard reference subtraction.

Several solutions generate two images, rotating the sample 90 degrees to generate the images. These solutions typically define a fast scan axis and a slow scan axis, with the fast scan axis data being acquired in a shorter amount of time. Drift in the fast scan axis is often ignored because of this—the system assumes all the data in that line represents the surface topography. In the slow scan axis, the line-to-line direction as the AFM rasters across the surface, drift cannot be ignored because the Z height position changes induce what looks like a low frequency oscillation in the data. In the known solutions, the scan direction is fixed and the two images are subtracted to create a best fit image, or the images are combined into a single image (e.g., to remove scanner bowing). In practice, however, all these known techniques attempt to provide a reference but in each case the reference is flawed—Z height line to line does not mimic reality. Moreover, they typically employ post-image acquisition cross-correlation processing. As a result, the user is unable to make AFM parameter adjustments during the scan to optimize the quality of the acquired data.

As a result, the AFM field, was in need of a solution to address and minimize/eliminate the effect of mechanical perturbations in the system such as drift by providing correction of, in particular, perturbations related to the scanner relative to the sample as Z height changes. Improved data acquisition and display times were desired, preferably with no post-image acquisition processing. Moreover, the ability to adjust AFM scan and image acquisition parameters during operation was desired.

SUMMARY OF THE INVENTION

The preferred embodiments overcome the drawbacks of current AFM systems that attempt to address drift effects in AFM imaging by providing an autocorrelation method that does not require post-image processing. By mapping, in real-time during the data scan, a data image to a reference image initially acquired in the slow scan axis of the data scan (reference plane), the effects of mechanical perturbations due to drift are minimized. High resolution images result while allowing the user the flexibility to adjust AFM parameters based on observation of the final image being generated in real time. Real time processing is the execution of data processing in a short time period during AFM image acquisition, providing near-instantaneous output.

According to one aspect of the preferred embodiments, a method of atomic force microscopy (AFM) includes providing relative scanning motion between a probe of the AFM and a sample in a direction orthogonal to a scan direction of a data scan in a region of interest of the sample. The method then detects probe deflection during the providing step, probe deflection being indicative of a property of a surface of the sample and generates a reference image (i.e., plane) based on the detecting step. Thereafter, the method includes supplying relative scanning motion between the probe and the sample to perform the data scan in the region of interest and measuring probe deflection during the supplying step, probe deflection being indicative of the property. Then the method generates a data image based on the measuring step, and generates a final image in real-time based on the sample image and the reference image.

According to a further aspect of this preferred embodiment, the providing step is a fast scan, and the orthogonal direction is a slow scan axis of the data scan.

In another aspect of this preferred embodiment, the reference image is a reference plane, and the generating the final step includes adding the sample image and the reference image.

According to another aspect of this preferred embodiment, the scanning motion is a raster scan, and the method further includes repeating all the steps until a region of interest of the sample is imaged.

In another aspect of the preferred embodiments, the detecting and the measuring steps are performed in a mode of AFM operation, and the mode is one of peak force tapping (PFT) mode, contact mode and tapping mode.

According to a further aspect of the preferred embodiments, the property is the topography of the surface. Moreover, the method further includes adjusting at least one of a) a scan parameter of the method, or b) the region of interest during the supplying step, and then repeating all the steps.

In another preferred embodiment, an atomic force microscope (AFM) includes a scanner that provides relative scanning motion between a probe of the AFM and a sample, and a detector that measures the deflection of the probe in response to probe-sample interaction during AFM operation, the deflection being indicative of a sample property and stored as an image. The AFM also includes a controller that generates control signals based on the deflection and a computer that generates a reference image based on the deflection when the scanning motion is along a slow scan axis of an data scan. The computer generates a data image based on the deflection when the scanning motion is along a fast scan axis of the image scan, and c) maps the data image against the reference image in real-time during generation of the data image to produce a final data image.

In another aspect of the preferred embodiments, the scanning motion generates the reference image in a direction orthogonal to a scan direction of a data scan and the orthogonal direction is a slow scan axis of the data scan.

According to a further aspect of the preferred embodiments, the controller generates control signal in one of contact mode, non-contact mode, tapping mode, and peak force tapping mode. Moreover, the controller adjusts at least one of a) a scan parameter of the AFM, or b) the region of interest during mapping of the data image.

According to another embodiment, a method of atomic force microscopy (AFM) includes providing relative scanning motion between a probe of the AFM and a sample in a region of interest of the sample. Then the method includes detecting probe deflection during the providing step, and generates a reference image based on the detecting step. Thereafter, relative scanning motion between the probe and the sample is supplied to perform a data scan in the region of interest. The probe deflection is measured during the producing step and a separation between the probe and the sample is controlled based on the measuring step. The method then includes adjusting, in real-time during the producing step and based on the controlling step, at least one of a) a scan parameter of the method, and b) the region of interest during the producing step, and then repeating all the steps.

In yet another embodiment, a method of atomic force microscopy (AFM) includes providing relative scanning motion between a probe of the AFM and a sample in a slow scan direction of a data scan to generate a reference image of a region of interest and producing relative scanning motion between the probe and the sample in a fast scan direction to generate a data image. The method then plots the data image against the reference image in real-time during the producing step to generate a final drift corrected data image without post-image acquisition processing.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 5 is a raw AFM topography image, without drift correction;

FIGS. 6A and 6B are plots illustrating the effects of drift in the image of FIG. 5;

FIG. 7 is an AFM topography image, with drift correction using the method and apparatus of the preferred embodiments; and FIGS. 8A and 8B are plots illustrating the effects of drift correction in the data image of FIG. 7.

DETAILED DESCRIPTION OF THE PREFERRED EMBODIMENTS

The preferred embodiments are directed to a drift correction method and system for Atomic Force Microscopy (AFM) which allows for the minimization/elimination of drift effects in AFM systems, without post-image processing. The methods described herein employ autocorrelation, in which an initial image in a region of interest of a sample is generated with the fast scan axis orthogonal to the fast scan axis of the intended data scan. This can be accomplished by altering the scan angle so the scan runs the fast scan in the direction of the slow scan axis of the intended data scan, or rotating the sample 90°. When this initial image is used as a reference plane for the intended data scan, the long time scale Z drift error is minimized. This is performed in real time to maximize efficiency, accuracy and flexibility of user control.

Figure 1:
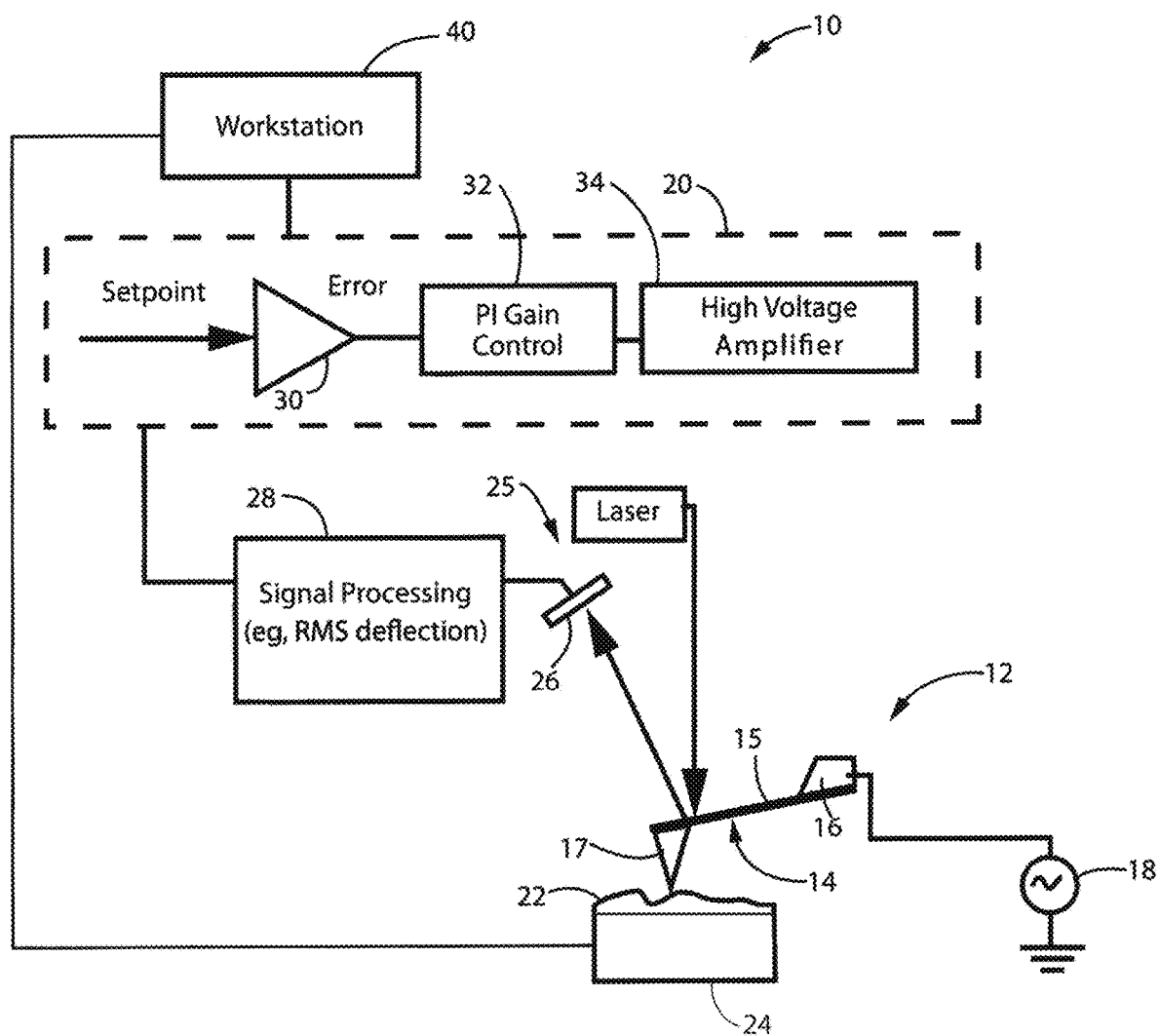
FIG. 1 is a schematic illustration of a Prior Art atomic force microscope AFM.
Figure 2A:
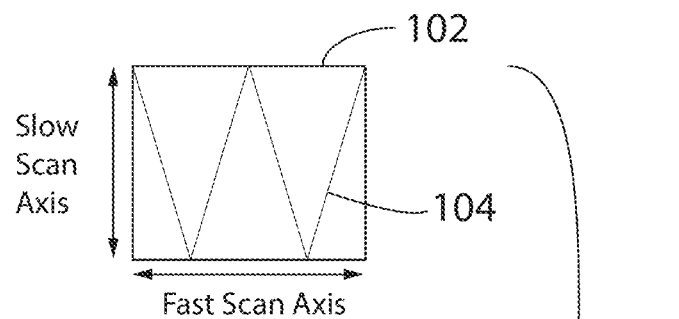
FIGS. 2A-2C is a series of schematic illustrations of scans used in the preferred embodiments to accommodate drift during AFM image acquisition without post-image processing.
Figure 2B:
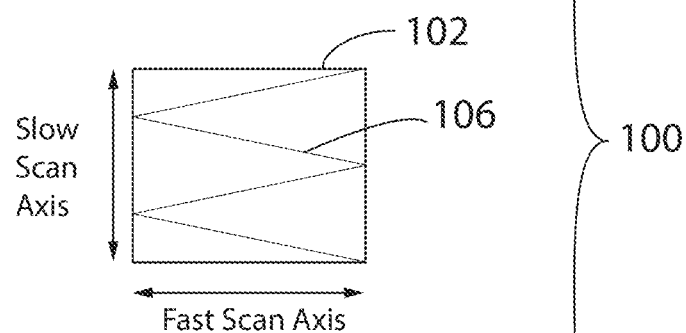
Figure 2C:
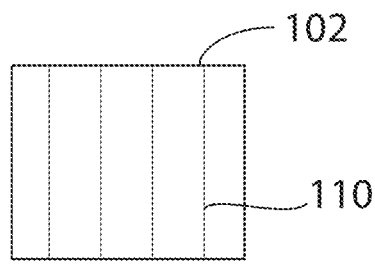

Turning initially to FIGS. 2A-2C, a simplified illustration 100 of a series of AFM scans of a method of a preferred embodiment is shown. Moving from top to bottom, a sample 102 with regions of interest having features of interest to be imaged is schematically shown in FIG. 2A. Prior to the AFM performing a final data scan, a reference scan is conducted in which AFM data acquisition is performed along raster scan lines 104. High speed AFM imaging is conducted, in this case, along the slow scan axis of the final data scan. Again, the sample may be rotated 90° for this scan or the scan angle may be altered so the raster scan is along this slow scan axis. In this way, a fast scan is conducted in the slow scan axis of the data scan and a reference image is acquired.

Next, in FIG. 2B, a data scan is conducted in which the raster scan is performed in the direction of the fast scan axis of the final data scan. This is the standard AFM topography image of the sample/region of interest. The raster scan lines 106 are along the fast scan axis of the final data scan. It is this image that can be compromised by system anomalies such as drift in the Z direction, causing an artifact in the topography image of the sample surface in the region of interest.

FIG. 2C illustrates the autocorrelation of the preferred embodiments when the final data scan, i.e., topography image, of FIG. 2B is mapped, line-by-line, to the reference image generated in FIG. 2A. The processing of these two images produces an image in which lines 110 in the drift-affected slow scan axis are corrected with the autocorrelation of the two images to produce an image having drift corrected topography.

Figure 3:
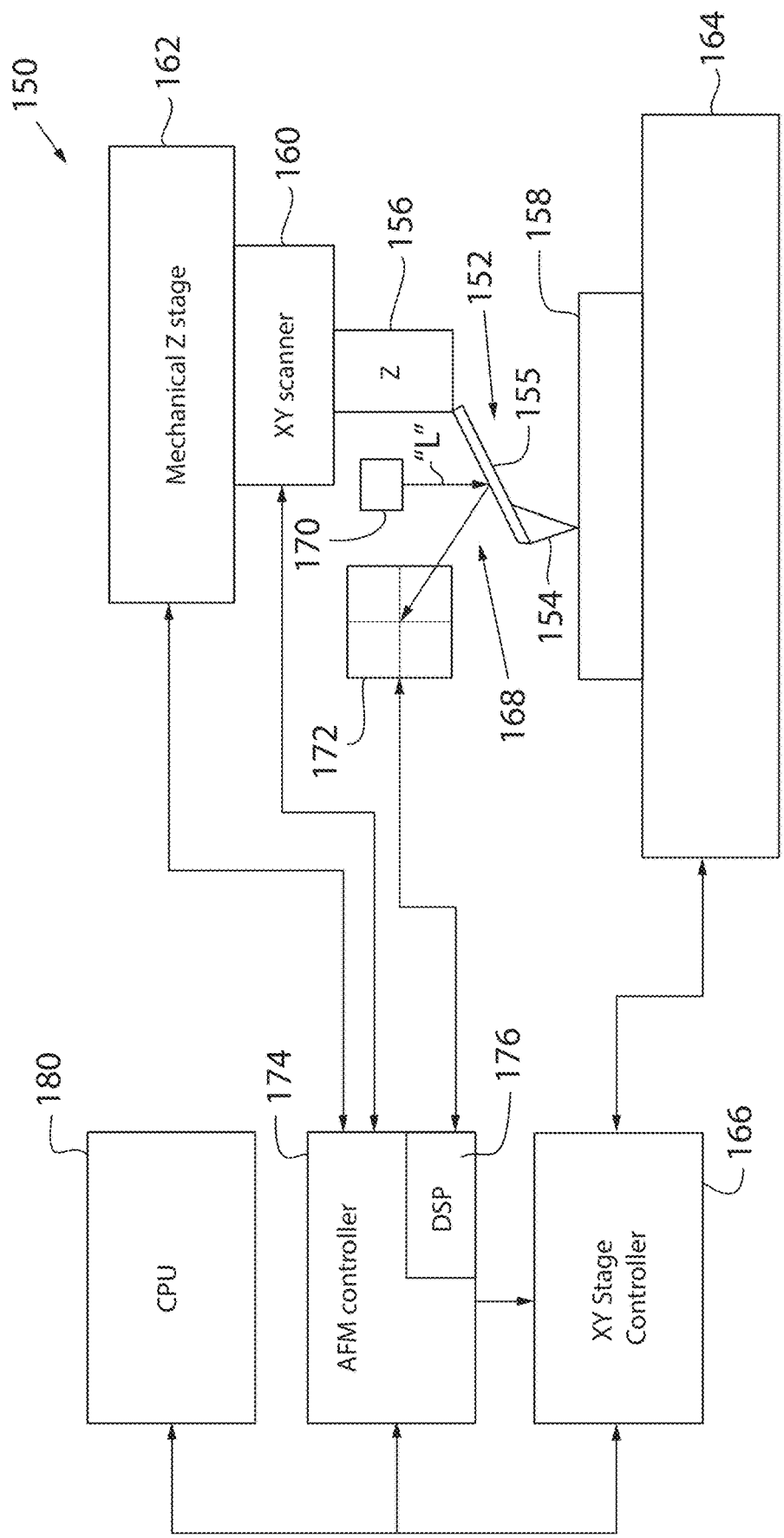
FIG. 3 is a block diagram of an AFM system for acquiring AFM data and generating an AFM image substantially free of drift effects.

A scanning probe microscope instrument 150 (e.g., AFM) according to a preferred embodiment is shown in FIG. 3. In this system, a probe 152, having a tip 154 is held by a probe holder (not shown) supported by piezoelectric tube scanner 156. Scanner 156 is a "Z" or vertical scanner responsive to sample properties in the closed loop control system to position the tip 154 relative to a sample 158 during AFM imaging. Tube scanner 156 is coupled to an XY scanner 160, preferably also a piezoelectric tube, that is used to raster the probe tip 162 relative to the sample surface during AFM operation. A mechanical Z-stage 162 is employed for providing large movement in Z between tip 154 and sample 158, for example, during AFM image acquisition start-up to engage tip 154 and sample 158. Sample 158 is mounted on an XY stage 164 that primarily provides coarse XY motion to position probe 152 at a region of interest of sample 158. An XY stage controller 166 controls stage 164 to locate the probe/sample at that region of interest. However, stage 164 may be configured to provide relative scanning motion (e.g., raster) between tip 154 and sample 158 at a selected scan speed. Controller 166 is also responsive to AFM controller 174 to position the data scan at a region of interest. Controllers 166, 174 are implemented by a computer 180.

In operation, after tip 154 is engaged with sample 158, a high speed scan of the sample is initiated with XY scanner 160 in a selected mode AFM mode of operation (e.g., PFT mode), as discussed previously. In an initial "reference plan" scan (FIG. 2A), the fast scan proceeds in the slow scan axis of the typical data scan. The scan angle is modified to accomplish this reference scan, or the sample is rotated 90°. As tip 154 interacts with the surface of sample 158, the probe 152 deflects and this deflection is measured by an optical beam-bounce deflection detection apparatus 168. Apparatus 168 includes a laser 170 that directs a beam "L" off the backside of cantilever 155 and toward a photodetector 172 which transmits the deflection signal to, for example, a DSP 176 of AFM controller 174 for high speed processing of the deflection signal.

AFM controller 174 continuously determines a control signal according to the AFM operating mode, and transmits that signal to the piezo tube 156 to maintain the Z position of probe 152 relative to sample 158, and more specifically, to maintain deflection of the probe at the feedback setpoint. Controller 174 also implements the generation of the reference image. This AFM control is further illustrated and described below in connection within the method shown in FIG. 4.

Figure 4:
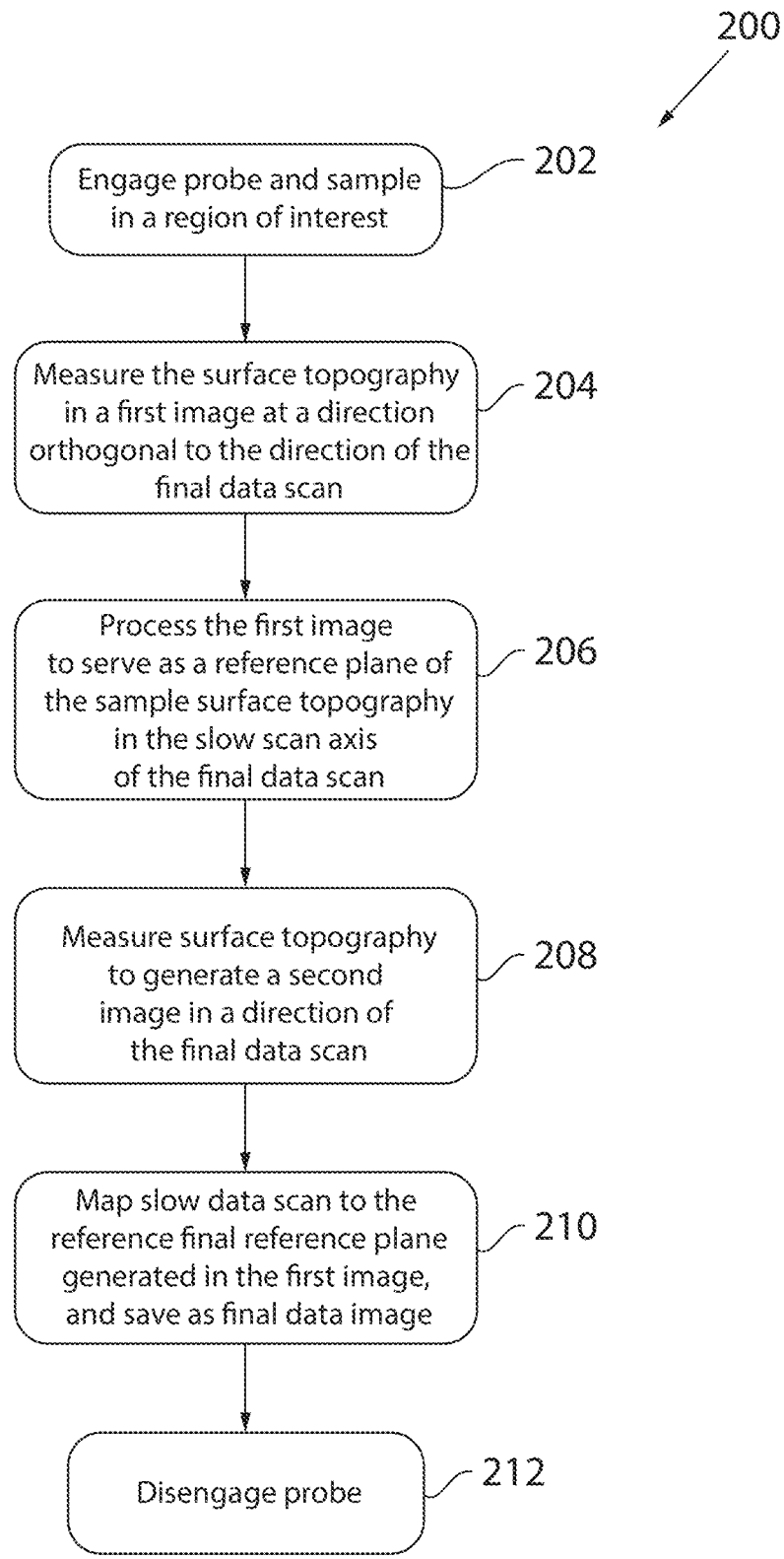
FIG. 4 is a flow chart illustrating a drift correction method of the preferred embodiments.

In FIG. 4, a method 200 of real-time correction of drift in AFM image data is shown. In Block 202, the AFM tip is engaged with the sample surface in a region of interest. An initial scan of the sample is performed in Block 204 and saved as reference data in a mode of AFM operation (tapping, PFT, etc.). This scan is a high speed scan [[rate?]] performed in the slow scan axis of the final AFM data scan (see FIG. 2A). As described previously, either the scan angle can be changed or the sample rotated so the scan is 90° to the fast scan axis of the final data scan of the region.

The drift correction method 200 then includes, in Block 206, processing the data to produce a first or reference image. This image defines a "reference plane" that will subsequently be used in an autocorrelation operation with the image scan data to correct the drift effects on the topography data, described further below. An AFM data scan of the region of interest in the selected mode of AFM control is then initiated in Block 208. In this step, the raster motion extends along the fast scan axis of the image scan (FIG. 2B). A property of the sample surface (i.e., topography) is measured and the data stored as sample data. The resulting image includes fast scan axis data and slow scan axis data orthogonal thereto.

In Block 210, Method 200 maps the slow scan data of the final data scan to the best fit and filtered mean reference plane generated in the first image and saves the result as the final data image. This final data image results in a drift corrected mapped image being produced in real time during the creation and capture of the final data scan individual fast axis data lines. The probe and sample are then disengaged in Block 212, producing an AFM image reflecting real-time drift correction. Exemplary data is shown in FIGS. 5 and 6A and 6B (uncorrected AFM image), as well as in FIGS. 7 and 8A and 8B (drift corrected AFM image).

Turning initially to FIG. 5, a conventional AFM image 300 is shown in which an AFM scan is performed along the fast scan axis of the final data scan of a surface of a sample. Notable are the lighter sections 302 that alternately appear with darker sections 304. This is illustrating the drift effect in the slow scan axis when scanning the region of interest during a typical AFM data scan. The stark contrast line to line is due to mechanical perturbations in the system, e.g., drift in the vertical or Z direction. As will be more clear below, this long time scale drift error significantly compromises the resolution of the features of interest (e.g., topography) in the region.

As shown in FIG. 6A, this drift effect in the slow axis appears as an artifact in plot 400 (more noticeable in comparison to the data from the corrected image show in FIG. 8A, described below). To address and minimize this low frequency drift artifact, the above-described method is employed, and the image in FIG. 7 described immediately below, results. The region highlighted between the vertical cursors is an artifact that is not related to sample topography, and that applying the referenced method here, the artifact is removed to more correctly represent the sample surface topography (discussed further below in connection with FIG. 8A). FIG. 6B highlights the artifact at region 502 of plot 500, illustrating the low frequency long time scale drift. Again, the Z drift correction algorithm 200 of the preferred embodiments (FIG. 3) initially captures a reference image (defining a plane of the region of interest by rotating the sample by 90°). This reference image capture is automated and hidden from the user. It is embedded in the image file and is subsequently used in an autocorrelation mapping operation to remove the drift artifact as described previously. This is shown in FIGS. 7 and 8A and 8B.

FIG. 7 illustrates a drift-corrected final AFM data image 600. This image is produced with the drift affected data scan (normal orientation—fast scan along the fast scan axis) together with the reference plane produced using the initial orthogonal scan. Unlike the raw image in FIG. 5, the surface features in the region of interest are much higher resolution due to removal of the Z drift error. A comparison of the amplitude in FIG. 6A (from the raw data) and FIG. 8A (drift-corrected data 602) illustrates this correction of the low frequency drift artifact. A similar comparison of FIGS. 6B and 8B illustrates the same (in the region 502 of FIG. 6B), with the low frequency components of the amplitude signal 604 greatly reduced in FIG. 8B after drift correction.

Overall, the preferred embodiments provide high resolution AFM images substantially free of adverse effects due to mechanical drift in the AFM environment. The method and system provide speed and accuracy advantages as well as real-time feedback to the user which affords the user flexibility in managing the operation of the AFM. More particularly, the system and method allow for adjustment, in real-time ("real-time" being defined as during acquisition and generation of the data image of the regions of interest of the sample—i.e., the execution of data processing in a short time period during AFM image acquisition, providing near-instantaneous output), of scan parameters of AFM operation, including control setpoint, scan speed and direction, phase/ amplitude of the drive signal, etc., as well as the scan location. In sum, a high resolution data image of one or more regions of interest can be produced without the need for post-processing of the raw data image. The resulting final data images are substantially free of mechanical disturbances due to drift.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

We claim:

1. A method of atomic force microscopy (AFM), the method comprising:

providing relative scanning motion between a probe of the AFM and a sample in a direction orthogonal to a scan direction of a data scan in a region of interest of the sample;

detecting probe deflection during the providing step, probe deflection being indicative of a property of a surface of the sample;

generating a reference image based on the detecting step;

producing relative scanning motion between the probe and the sample to perform the data scan in the region of interest;

measuring probe deflection during the producing step, probe deflection being indicative of the property, and generating a data image based on the measuring step; and generating a final image in real-time based on the data image and the reference image.

2. The method of claim 1, wherein the providing step is a fast scan.

3. The method of claim 1, wherein the orthogonal direction is a slow scan axis of the data scan.

4. The method of claim 1, wherein the reference image is a reference plane.

5. The method of claim 1, wherein the generating the final image includes adding the sample image and the reference image.

6. The method of claim 1, wherein the scanning motion is a raster scan.

7. The method of claim 1, wherein the detecting and the measuring steps are performed in a mode of AFM operation, and the mode is one of peak force tapping (PFT) mode, contact mode and tapping mode.

8. The method of claim 1, wherein the property is topography of the surface.

9. The method of claim 1, further comprising adjusting at least one of a) a scan parameter of the method, or b) the region of interest during the supplying step, and then repeating all the steps.

10. An atomic force microscope (AFM) comprising:

a scanner that provides relative scanning motion between a probe of the AFM and a sample;

a detector that measures the deflection of the probe in response to probe-sample interaction during AFM operation, the deflection being indicative of a sample property and stored as an image; and a controller that generates control signals based on the deflection; and a computer that generates a reference image based on the deflection when the scanning motion is along a slow scan axis of a data scan, and thereafter generates a data image based on the deflection when the scanning motion is along a fast scan axis of the image scan, and c) maps the data image against the reference image in real-time during generation of the data image to produce a final data image.

11. The AFM of claim 10, wherein the scanning motion to generate the reference image is in a direction orthogonal to a scan direction of a data scan.

12. The AFM of claim 10, wherein the orthogonal direction is a slow scan axis of the data scan.

13. The AFM of claim 10, wherein the controller generates control signal in one of contact mode, non-contact mode, tapping mode, and peak force tapping mode.

14. The AFM of claim 10, wherein the controller adjusts at least one of a) a scan parameter of the AFM, or b) the region of interest during mapping of the data image.

15. A method of atomic force microscopy (AFM), the method comprising:
   providing relative scanning motion between a probe of the AFM and a sample in a slow scan direction of a data scan to generate a reference image of a region of interest;
   supplying relative scanning motion between the probe and the sample in a fast scan direction to generate sample data; and
   plotting the sample data against the reference image in real-time during the supplying step to generate a final drift corrected data image without post-image acquisition processing.

* * * * *